March 21, 1939. G. SPATTA 2,150,948
AXLE HOUSING AND METHOD OF MAKING THE SAME
Filed June 14, 1935 2 Sheets-Sheet 1
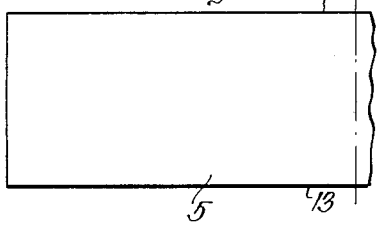
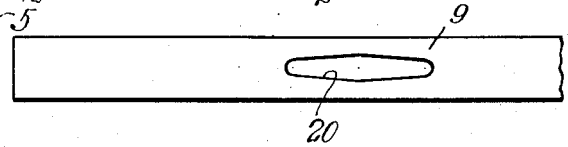
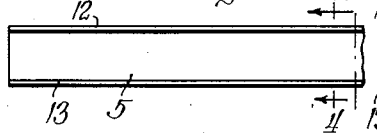
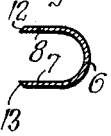
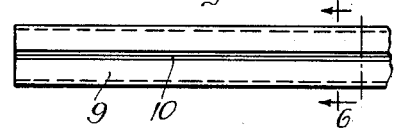
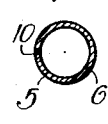
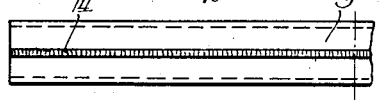
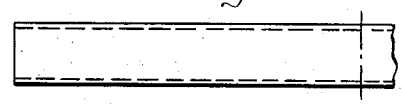
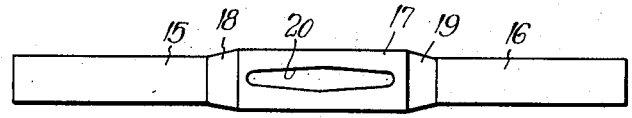
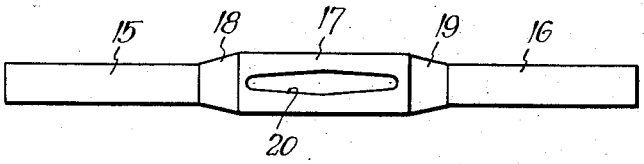
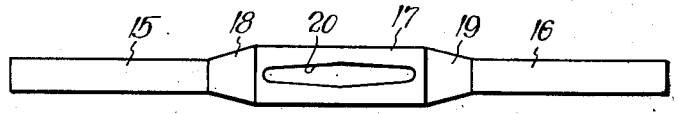
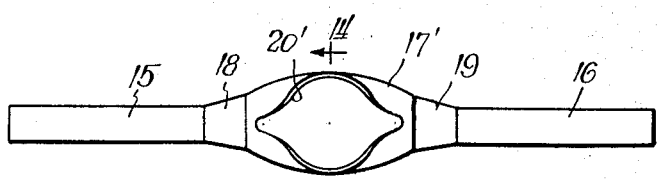
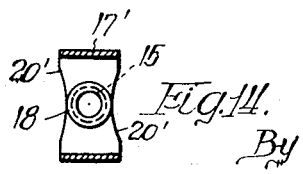
Inventor:
George Spatta

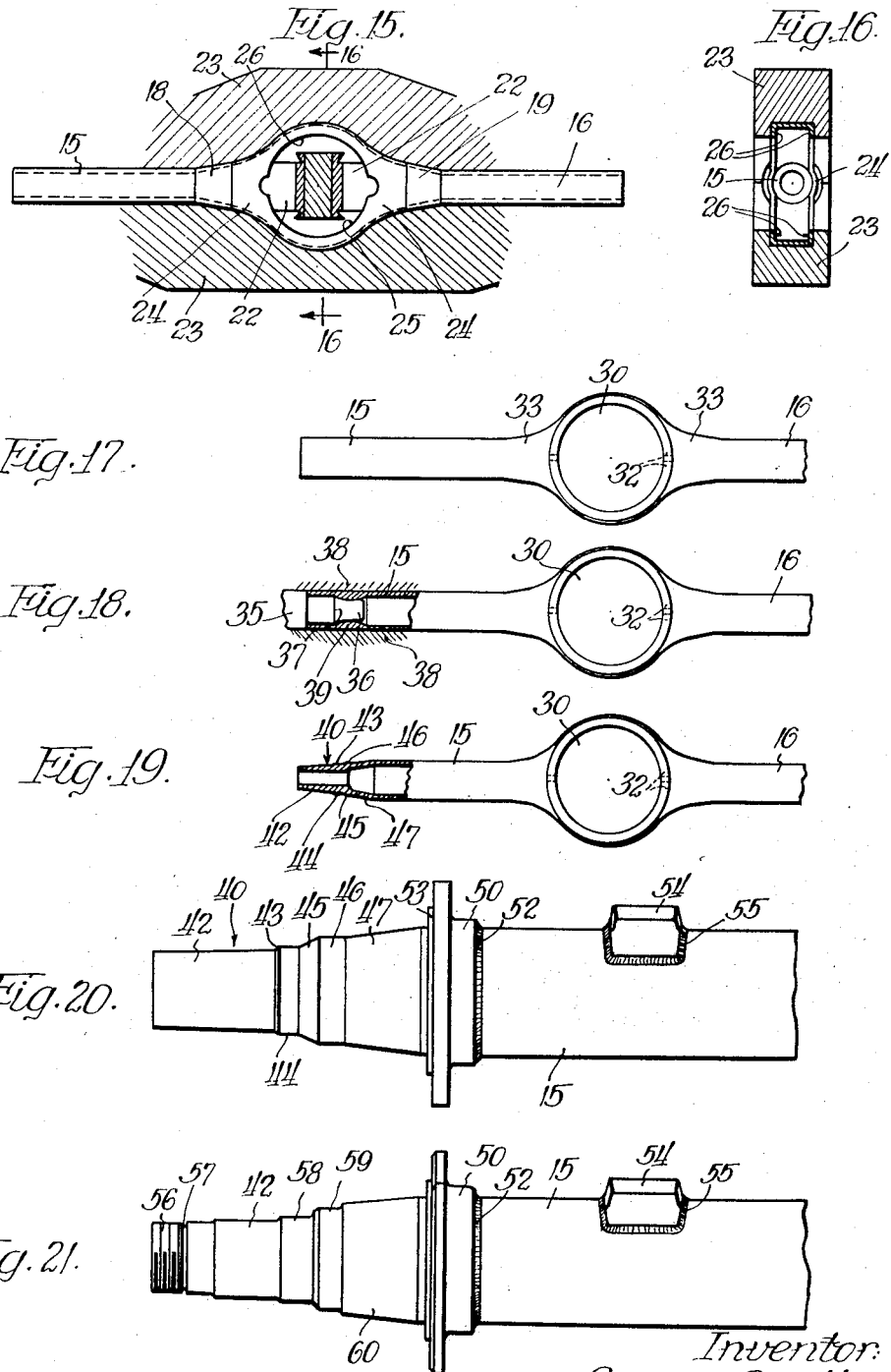

Patented Mar. 21, 1939

2,150,948

UNITED STATES PATENT OFFICE 2,150,948

AXLE HOUSING AND METHOD OF MAKING THE SAME

George Spatta, Buchanan, Mich., assignor to Clark Equipment Company, Buchanan, Mich., a corporation of Michigan Application June 14, 1935, Serial No. 26,535

8 Claims. (Cl. 29—153.1)

This invention relates to axle housings and the method of making the same, and is directed particularly to the formation of rear axle housings for motor vehicles, such as trucks, commercial automobiles, busses and the like, being concerned primarily with the formation of heavy duty housings of this type.

In its preferred embodiment, the present invention provides an axle housing and method of making the same in such manner as to reduce materially the cost of labor and materials necessary to fabricate the housing, without sacrificing any of the features which are essential to proper construction and use of such housings.

It is well known, in the art to which this invention relates, to form such axle housings of three sections, namely, a central banjo frame section having opposed short cylindrical sockets, with a pair of tubular arms press-fitted or otherwise suitably secured in the sockets and suitably formed at their outer ends by upsetting or swedging operations to thicken the same to provide bearing seats for the wheel assembly. Such a construction is disclosed in the patent to Mogford and Spatta, No. 1,955,824, of April 24, 1934.

It has also been the practice to form the rear axle housing from a slotted tube or a plate rolled into the form of a tube. This is produced by expanding the central portion of the tube into a banjo frame, and then thickening and upsetting the ends of the tube to form radial flanges at the ends of the axle housing arms for supporting a brake plate assembly or the like. This construction and the method of making the same have been disclosed in my Patent No. 1,926,353 of September 12, 1933.

However, nowhere in the prior art with which I am familiar has there been any attempt made to provide an axle casing or assembly in which a tubular blank, whether initially formed as a seamless tube, or as a plate rolled into tubular form and then welded along its longitudinal seam, is employed to produce a housing of the type disclosed herein. I contemplate the provision of such a housing having a central banjo frame portion, progressively thickened arm portions formed integral therewith and extending outwardly therefrom, with bearing portions formed at the outer ends of the arms, which bearing portions are reenforced and thickened to provide the proper rigidity and strength, the entire unitary assembly being then heat treated and machine finished to provide proper bearing surfaces for the wheel assembly.

The primary object of this invention is the provision of a method or process which will result in the manufacture of a strong, light and highly satisfactory rear axle housing or casing at a high rate of production and at low cost. My present invention is based upon a process of manufacture of such housings for the purpose intended, and in which process the steps are particularly adapted for rapid machine operations.

Another object of the present invention is to provide an axle housing as a result of the present process which will possess all the advantages and essential requirements necessary and incidental to its use and will yet be capable of mass production at low cost.

Another feature of the present invention resides in the method of forming axle housings with integral extending arms in which the initial thickness of the tubular blank or seamless tube is retained at the banjo portion of the housing, while the arms are progressively thickened by swaging and upsetting to provide adequate strength at the various portions thereof. This forms in effect a housing have a light weight central section and a progressively increasing thickness of wall section from the center outwardly toward the ends of the arms. As a result, a spring-like housing member is provided having relatively rigid end portions and resilient central portion.

Still another advantage of the present invention is the provision of a housing which may be formed to approximately its final shape by various machine operations, and may then be heat treated to temper the same before the final finishing operations are performed. I believe that the heat treatment of such axle housings as formed by the present method is broadly new over any of the art with which I am familiar. By such heat treatment an entirely different type of housing from what has heretofore been devised is obtained. The heat treatment herein disclosed tempers the metal and imparts to it a resilient character. While it was heretofore the practice to add metal and consequently material weight to the differential frame portion, as compared to the arms, in order to increase the rigidity thereof so that the housing would not deflect or crack under severe strains or stresses, the present invention departs entirely from such teachings, and contemplates an extremely light weight housing having a thin section of the central portion and gradually increasing in rigidity toward its limits. When heat treated as specified, the metal is relieved of all localized stresses and imperfections, and at the same time is placed in a resilient condition so that it may deflect under severe stresses but is capable of returning to its proper shape whenever the stress is removed.

In the fabrication of housings of this type, local impairments at various points in the housing are produced by reason of the welding operations required to secure the reinforcing strips about the banjo opening, and to secure the spring pads and brake plates to the arms. By proper heat treatment of the entire housing thereafter, I provide for removing such localized defects, and produce a fabricated resilient housing having uniform structural characteristics throughout.

Another feature of the present invention is the provision of a machine-formed housing upon which the spring pads and brake plate members may be welded into position prior to the final machining operation on the bearing seat.

Other advantages of the present invention will appear more fully from the following detailed description, which, taken in conjunction with the accompanying drawings, will disclose to those skilled in the art the particular method of manufacturing the housings produced in a preferred form of my invention, and the particular article produced by this method.

In the drawings:

Figure 1 is a plan view of a plate member from which the housings may be formed;

Figure 2 is an end elevational view of the plate member of Figure 1;

Figure 3 shows the plate member of Figure 1 after the first forming operation thereon;

Figure 4 is a sectional view on lines 4—4 of Figure 3;

Figure 5 shows the second operation for forming the tubular blank from the plate shown in Figure 1;

Figure 6 is a sectional view of the tubular blank shown in Figure 5, taken substantially on line 6—6 of Figure 5;

Figure 7 shows the tube welded along its longitudinal seam;

Figure 8 is a view of a corresponding seamless tube of the same wall thickness;

Figure 9 shows the slotting of the tube at the central portion thereof;

Figure 10 shows the first swaging operation upon the tubular blank, reducing the external diameter of the arms;

Figure 11 shows a second swaging or reducing operation for increasing the wall thickness of the arms of the blank;

Figure 12 shows a third swaging operation for producing increasing thickness of the arms outwardly from the central portion of the blank through the throat portion which joins the central portion to the arms;

Figure 13 shows the initial expansion of the central portion of the blank to form the banjo casing;

Figure 14 is a sectional view taken on line 14—14 of Figure 13;

Figure 15 discloses the shaping means for the next step in the operation of forming the banjo portion of the housing;

Figure 16 is a sectional view taken substantially on line 16—16 of Figure 15;

Figure 17 is an elevational view of the blank after the banjo frame has been formed and the transverse flanges pressed into final shape;

Figure 18 shows the upsetting of one end of the tubular arm to thicken the metal inwardly thereof;

Figure 19 discloses the upsetting and swedging of the end of the arm to provide a reenforced and thickened bearing seat portion thereon;

Figure 20 is an enlarged view of one end of the arm of the blank, showing the spring pad and brake plate member mounted thereon; and Figure 21 shows the final form of the housing arm after the machining operation forming the bearing seats at the reenforced and thickened end of the arm.

Referring now in detail to the drawings, the blank 5 shown in Figure 1 is preferably, although not necessarily, of hot rolled stock, as it comes from the rolls. The blank is of suitable thickness, and is sheared from the sheet, being of a width slightly less than the circumferential length at the critical section where the banjo frame and throat are joined.

This plate or sheet is then formed into a cylinder, preferably by two punch and die operations, although, if desired, a rolling operation may be substituted. In Figure 3 I have shown the blank 5 at the completion of the first punch and die operation, which operation forms the blank into a U-shaped radius corresponding to the radius of the completed cylinder. The U-shaped member thus formed is of uniform dimension throughout its entire length, that is, the radius of the arcuate portion 6 is the same throughout the entire length of the blank. To close the blank shown in Figures 3 and 4, a cooperating top die, semicylindrical in shape, is brought down over the straight portions 7 and 8, folding them toward each other, causing the edges to abut, and by compression, to arch out to fill the die.

The particular method in which the housing may be formed into a tubular blank is disclosed in detail in the Mogford and Spatta patent, No. 1,978,685, of October 30, 1934.

At the completion of this step in the process, the blank 5 is formed into a cylinder 9, which is of uniform diameter throughout its entire length and which has a longitudinal seam 10 formed by the abutting edges 12 and 13 of the blank. While the edges as shown in Figure 6 are slightly separated for the sake of clarity, they are actually in close contact. After the blank has been thus formed into a tubular cylinder, it may be welded, as shown at 14 in Figure 7, along its longitudinal seam, although this welding operation may be deferred until after the initial shrinking operation shown in Figure 10.

This shrinking operation to convert the cylindrical blank of Figure 5 to the blank shown in Figure 10 is accomplished by passing suitable ring dies longitudinally over the ends of the arms to form the end cylinder arm sections 15 and 16 to a smaller diameter than that of the central section 17, these end cylinders being connected to the central cylinder 17 by frusto-conical sections 18 and 19. Shrinking of the end cylinders and the frusto-conical sections in this manner keeps the abutting edges 12 and 13 of the stock firmly together along the seam 10, owing to the fact that the compressive or arch strength of the cylinders opposes the action of the die. This perfect seating of the abutting edges insures a strong welded seam even when it is subsequently welded after the shrinking operation. The swaging or shrinking is preferably performed in several steps, as disclosed in my Patent No. 1,962,944, of June 12, 1934.

As shown in Figure 8, a seamless tube of the same original wall thickness may be employed in place of forming the tubular blank shown in Figures 5, 6, and 7, if desired. However, after the formation of the tubular blank or cylinder, the operations subsequently performed are identical, regardless of whether the original blank was a seamless tube or was formed from a flat plate member.

The tubular blank is preferably slotted as shown in Figure 9 prior to the shrinking operation to provide two opposed longitudinally extending slots 20 in the central portion 17 thereof. These slotting operations may be performed in accordance with the method and means disclosed in my Patent No. 1,895,589, of January 31, 1933, if desired, or any other suitable slotting means and method may be employed for this operation.

In the manufacture of axle housings of the sizes most commonly used, the amount of reduction that can be made from the throat portion of the banjo, such as the throat portions 18 and 19 of Figure 10, to the end section of the housing is more than can be performed in a single step without imposing undue stresses upon the metal. In the preferred embodiment of my invention, I therefore provide for producing this reducing of the housing by three swaging operations, wherein three swaging dies are consecutively forced over the end sections of the tube to reduce the diameter in three steps.

These swaging operations are disclosed in detail in my Patent No. 1,962,944, of June 12, 1934. Suffice it to say that the first of the swaging dies forms the major portion of the threat of the banjo and is conical and of such size as to properly form this section of the housing. The next die is designed to continue with the cone, as shown in Figure 11, bringing the end sections of the blank nearer to the finished size, and the third die reduces the end section to the proper size.

The final swaging operation is shown as having been performed upon the blank illustrated in Figure 12, the end portions 15 and 16 of the blank being reduced to their proper size, while the frusto-conical sections 18 and 19 have been formed to proper thickness by the swaging operations to produce a sufficient thickness of metal to take care of the subsequent banjo and throat forming operations. It will be noted that the blank is increased in length during these operations.

The next step in the formation of the axle housing of the present invention is the initial spreading of the slots 20 formed upon opposite sides of the blank of the central portion 17 of the blank, whereby the banjo section is to be formed.

Thus, in Figure 13 the central portion 17' of the blank has ben spread outwardly, producing a corresponding spreading of the slots, as indicated at 20'. The spreading-machine and method shown in my Patent No. 1,925,850, of September 5, 1933, may, if desired, be employed for this purpose. This results in shaping the central portion of the blank to the form shown in section in Figure 14. After this spreading operation, the banjo casing itself is formed, as shown in Figures 15 and 16, suitable expanding die members 22 being employed for pressing the metal outwardly into the die blocks 23 to provide the tapered throat portions 24 between the circular banjo opening 25 and the frusto-conical sections 18 and 19 extending from the arms 15 and 16 toward the banjo section. The throat portions 24 may be formed into proper shape in accordance with the teachings of my Patent No. 1,912,600, of June 6, 1933, and the banjo portion itself may be expanded into position and the flanges thereof flattened and turned inwardly, as indicated at 26 in Figure 16. Suitable reenforcing rings 32 may be welded within these flanges to provide proper thickness for bolt holes or the like, if desired. The particular operations for forming the banjo may follow along the lines of those disclosed in my Patent No. 1,958,214 of May 8, 1934.

It will be noted that the banjo section as formed in Figure 15 has a wall thickness substantially equal to the thickness of the original plate member 5, while the throat portions 24, the frusto-conical sections 18 and 19, and the tubular arms 15 and 16 are progressively increased in thickness for proper strengthening of the axle housing.

In Figure 17 I have disclosed the housing after the banjo section 30 has been completely formed and with the throat portions 33 suitably swaged and merging into the thickened ends of the arms 15 and 16.

The next operation, shown in Figure 18, comprises the upsetting of the arms 15 and 16 in successive operations by means of the upsetting die member 35, having the head portion 36 provided with a shoulder portion 37 of slightly greater diameter than the internal diameter of the arm 15. Upon forcing of the die member 35 into the end of the arm 15 held within the die blocks 38, the metal interiorly of the arm at the end thereof is forced rearwardly to form a thickened portion indicated at 39. The blank or tubular arm 15 is thus gathered at its end section to thicken its walls and to shape it as required for the formation of the axle. The steps of my process begin with the gathering of the metal in the blank and are obviously the same regardless of whether the blank is made from seamless stock or from flat stock fabricated into cylindrical form in the manner heretofore described. The blank shown in Figure 17 is heated locally at the end of the arm 15, and then gripped in the die blocks 38 of a suitable forming press. The metal is gathered as indicated at 39 by the insertion of a gathering ram 35 within the end of the arm. This arm or punch 35 is shouldered as at 37 to engage the end of the blank and to force it longitudinally of itself to thereby gather metal as shown at 39. The inside diameter and shape of the gathered metal are controlled by the shape of the end 36 of the punch 35 in the usual manner. The outside diameter of the blank remains unchanged by the gripping action of the clamping die blocks 38 by which it is engaged. This operation of course shortens the length of the blank.

Preferably, after the walls of the blank have been thus thickened as shown in Figure 18, it is allowed to cool, and then swedged by forcing an external collar over its end section, indicated at 40, which moves the metal in that section inwardly to form a cylinder 42 which has a diameter somewhat smaller than the external diameter of the tubular arms 15. As shown, the internal diameter of the cylinder 42 is substantially the same as the internal diameter of the metal gathered at 39. However, this particular detail may be varied within the teachings of my invention.

Any preferred form of swedging machine may be used for this operation, and preferably a suitable punch is inserted in the inside of the tube to maintain the cylindrical section in alinemet with the cylindrical section of the arm 15. This swedging operation of course lengthens the tube somewhat, and forms a shoulder located adjacent the section 39 the walls which have been previously thickened.

Upon completion of the first step in the swedging operation, a second and similar step is performed, moving the metal in the cylinder radially inwardly to form a new cylinder of smaller diameter and slightly greater length, this operation forming a shoulder which is located farther from the end of the cylinder than the former shoulder, that is, the new shoulder is formed nearer the center of the thickened wall section 39.

As shown in Figures 19 and 20, a third and last swedging operation is next performed which operation moves the metal from the cylinder inwardly to form a new and final cylinder 42 of smaller diameter and greater length, the operation forming a shoulder 43 located adjacent the shoulder previously formed and at the end of the thickened wall region 39. A second shoulder 45 is formed at the end of the intermediate cylinder 44 formed in the second swedging operation, and joins the first cylinder 46 swedged in the initial operation. The cylinder 46 is joined to the arm portion 15 by a conical tapered portion 47 formed in the first swedging operation.

Since the external surface of the blank must be subsequently machined to form seats for the bearings of the wheel and for the grease retaining devices, no effort is made during the swedging operations to form a smooth shoulder at the junction of the thick wall section and the end cylinder of the blank, and the shoulders 43, 45 and 47 are all somewhat visible in the completed blank.

Preferably the swedging operations are all made with the blank cold, and by a hydraulic swedging machine, although if desired, hot swedging processes may be substituted within the teachings of my invention. Further, the three steps enumerated by way of example may be increased or decreased as desired.

These swedging operations tend to thicken the walls of the cylinder, this thickening supplying excess metal which is removed in the machining operation, with the result that the wall thickness of the end cylinder in the finished housing is substantially the same as the wall thickness of the main part of the arm 15. Obviously by suitable design of the punch and swedging dies employed to form this cylinder, the walls of it can be thickened more or less as desired.

Before the heat treatment of the housing, suitable brake plates 50 are welded, as at 52, to the arms 15 of the housing, as shown in Figure 20, the brake plates 50 preferably being provided with an annular collar or shoulder portion 53 facing outwardly thereof.

Spring pads 54, which may be of the type shown in the Mogford and Spatta Patent No. 1,978,685, of October 30, 1934, may be welded as at 55 about their engaging edges to the arms 15 and 16 of the blank by any suitable means, the spring pads 54 being located inwardly with respect to the brake plates 50.

After the last of the swedging operations, the entire housing is heated to a proper temperature, such as 1525 to 1575 degrees, and then quenched in water or the like for tempering the housing. This heat treatment is of extreme importance, as it provides for strengthening of the housing to an extent not hitherto attainable, without in any way requiring increasing of the wall thickness of any portion of the housing. The heat treatment, further, is preferably performed before the final machining and finishing operation upon the housing, so that any warping or twisting of the housing during the heat treatment will not result in misalignment of machined bearing surfaces or the like. Such heat treatment, followed by a reheating up to any desired temperature, in a preferred embodiment of the invention this temperature reaching 950°, removes all impairments caused by the preceding welding operations securing the pads and brake plates to the housing.

After the securing of the brake plates 50 and spring pads 54 to the housing and the heat treatment thereof, the end portion 40 of the arms 15 and 16 are machined, as shown in Figure 21. This machine operation may be performed in a suitable lathe, which finishes the external surface of the end portion 40 of the blank into a perfect cylinder of a particular diameter, this diameter being held within close limits particularly at its end. The end cylinder 42 is thereby machined smooth, and a threaded portion 56, oil groove 57, bearing race seat 58 and oil retainer seat 59 are formed in it, all of these being held to rather close limits in accordance with established practice. The cylinder portion 42, which is of smaller diameter than the main portion of the arm 15, is disposed with its axis in alignment with the axis of the arm 15, and is joined to the larger diameter arm by a frusto-conical section 60, the external surface of which is machined to an accurate taper.

The housing is then cleaned, painted, and is ready for reception of the differential driving members and axle shafts which are incorporated therein.

It is believed apparent that the particular sequence of steps in the operations of forming the housing of the present invention may be varied as desired, and that the resulting housing produced, can be produced either from fabrication initially of a flat plate member into a rolled tubular blank, or from a seamless steel tube. The particular operations for sloting the tubes, expanding the central portion of the banjo into proper form, smoothing and forming the throat portions leading to the thickened arms, and other operations may be performed in any desired manner, and the particular limitations as to thickness of the bearing seats at the ends 40 of the arms 15 and 16, and the manner in which these arms are swedged to their final form, may be varied within limits in any desired manner to meet special requirements.

While I have shown and described the axle housing and method of forming the same as a sequence of preferred operations as disclosed in the drawings, I do not intend to be limited to these specific operations, but intend that the present invention shall be directed broadly to the formation of a unitary light-weight axle housing having integrally extending thickened arms, the banjo portion of the housing having a thickness substantially equal to the original thickness of the plate member from which the blank has been fabricated, while the arms are successively increased in thickness so that at their outer ends they provide suitably reinforced bearings seats for the wheel assemblies. The heat treatment tempers the metal to increase its resiliency and at the same time removes the impairments in structure produced by the various forming operations.

It is to be understood, therefore, that the invention is not to be limited except as defined by the scope and spirit of the appended claims.

I claim:

1. The method of forming a unitary axle housing from a tubular blank of uniform wall thickness, which comprises swaging arm portions on said blank of decreased external diameter, said blank having a pair of opposed longitudinal slots in said central portion, further swaging the blank to reduce the diameter of the arm portions and simultaneously increase their wall thickness progressively toward the outer ends thereof, spreading said slotted portion of said blank to form a banjo frame having a wall thickness substantially equal to the original thickness of said blank, upsetting metal inwardly at the ends of said arms, swaging said ends to reduce the diameter thereof and to form reinforced bearing seating portions, heating said blank and quenching the same to temper said housing, and machining the reduced swaged ends of said arm portions.

2. The method of forming a rear axle housing from a flat plate of uniform thickness, which comprises forming said plate into a tubular blank of uniform wall thickness, forming extending arms spaced from the center of said tubular blank and of increasing wall thickness toward the outer ends thereof and of uniform reduced external diameter, forming said central portion into a banjo frame having a wall thickness substantially equal to the initial thickness of said plate, and having throat portions merging into said arms and progressively increasing in thickness toward said arms, heating said entire housing to a temperature of not less than 1525° F., quenching said heated housing, and reheating the same to not less than 950° F.

3. The method of forming an axle housing, which comprises rolling a flat plate into a tubular blank, welding the longitudinal seam of said blank, swaging a portion of the blank to form an arm portion of reduced external diameter and increased wall thickness, heating and expanding the unswaged portion of said blank into a flanged banjo frame portion having a throat portion progressively increasing in thickness toward the thickened arm portion, heating and upsetting the end of said arm portion to form wheel bearing seats, welding a spring pad and brake plate to said arm portion and a reinforcing strip to the flange of said banjo frame portion, and heat treating the fabricated housing to eliminate localized defects occasioned by the forming and welding operations.

4. In the method of forming an axle housing as set forth in claim 3, the method of heat treating said housing, which comprises heating said housing as so fabricated to a temperature of not less than approximately 1525° F., quenching the heated housing, and reheating said housing to approximately 950° F.

5. As an article of manufacture, a light-weight rear axle housing having a central differential frame section and oppositely extending tubular arms terminating at their outer ends in reduced and thickened external bearing seat portions, the wall thickness of said housing increasing progressively from said central frame section to said arm extremities, said housing being heat treated subsequent to formation thereof to remove localized stresses and to increase the resiliency of said housing between said arm extremities whereby said housing is not permanently deflected under severe loadings.

6. As an article of manufacture, a light weight sheet metal housing having a longitudinal welded seam and comprising a central transversely expanded differential frame provided with integral oppositely extending arms of reduced diameter and of progressively increasing wall thickness from said frame outward to adjacent the ends of said arms, said arm extremities being further reduced in diameter and increased in wall thickness to provide a housing having rigid arm extremities and a deflectable portion intermediate the ends thereof, said housing being subjected to a heat-treatment after formation to eliminate localized stresses and to increase the resiliency of said intermediate portion.

7. As an article of manufacture, a rear axle housing formed from relatively light gauge plate and having a central banjo section and oppositely extending tubular arms provided at their extremities with thickened reduced ends, the wall thickness of said arms progressively decreasing from the extremities toward the center of said housing, the entire housing being heat treated to form the same into a spring member having maximum deflection at the center thereof.

8. The method of forming a rear axle housing from a tubular blank of uniform thickness which comprises forming extending arms of reduced diameter on opposite sides of the center portion of said blank and simultaneously progressively increasing the wall thickness of said arms toward the extremities thereof, slotting said blank at the central portion thereof, heating and expanding said central portion into a banjo frame having a wall thickness substantially equal to the original thickness of said tubular blank, heating and upsetting the ends of said arms to form thickened reduced bearing portions, welding brake plates and spring pads on the external surfaces of said arms adjacent the upset ends, heat treating the entire blank after the forming and welding operations, and forming bearing surfaces at the upset ends of said arms.

GEORGE SPATTA.